(12) United States Patent  
Ojiro

(10) Patent No.: US 6,748,075 B2
(45) Date of Patent: Jun. 8, 2004

(54) TELEPHONE AND CORDLESS TELEPHONE

(75) Inventor: Akira Ojiro, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/036,969

(22) Filed: Dec. 21, 2001

(65) Prior Publication Data
US 2002/0150222 A1 Oct. 17, 2002

(30) Foreign Application Priority Data
Dec. 26, 2000 (JP) ........................................ 2000-394310

(51) Int. Cl.[7] ................................................ H04M 1/00
(52) U.S. Cl. .............................. 379/374.02; 379/88.19; 379/142.06; 379/418
(58) Field of Search ............................ 379/88.19, 88.2, 379/88.21, 67.1, 373.01, 373.02, 373.04, 373.05, 374.01, 374.02, 375.01, 376.02, 377.02, 418

(56) References Cited

U.S. PATENT DOCUMENTS

| | | |
|---|---|---|
| 4,672,660 A | 6/1987 | Curtin |
| 4,894,861 A | 1/1990 | Fujioka |
| 4,899,358 A | 2/1990 | Blakley |
| 5,007,076 A | 4/1991 | Blakley |
| 5,289,530 A | 2/1994 | Reese |
| 5,526,406 A | 6/1996 | Luneau |
| 5,577,104 A * | 11/1996 | Knuth et al. ............. 379/67.1 |
| 5,646,979 A * | 7/1997 | Knuth ......................... 455/563 |
| 5,699,410 A * | 12/1997 | Imamura et al. ......... 379/88.16 |
| 5,796,806 A | 8/1998 | Birckbichler |
| 5,883,942 A | 3/1999 | Lim et al. |
| 6,373,925 B1 * | 4/2002 | Guercio et al. ................ 379/82 |
| 6,466,653 B1 * | 10/2002 | Hamrick et al. ........... 379/67.1 |

FOREIGN PATENT DOCUMENTS

| | | |
|---|---|---|
| JP | 01-170253 | 7/1989 |
| JP | 02-058463 | 2/1990 |
| JP | 04-343555 | 11/1992 |
| JP | 05-268318 | 10/1993 |
| JP | 07-303146 | 11/1995 |
| JP | 11-046228 | 2/1999 |
| JP | 2000-069124 | 3/2000 |
| JP | 2001-053833 | 2/2001 |

OTHER PUBLICATIONS

Japanese search report for PCT/JP01/11179 dated April 9, 2002.
English translation of Form PCT/ISA/210.

* cited by examiner

Primary Examiner—Fan Tsang
Assistant Examiner—Olisa Anwah
(74) Attorney, Agent, or Firm—RatnerPrestia

(57) ABSTRACT

A telephone reads out caller information between rings even if a caller is unregistered. The telephone includes a caller information receiver for receiving a call ring and caller information coming in from a caller identification service, a caller information memory for storing the received caller information, a voice generator for generating voice data from the caller information, a speaker for outputting the voice data, and an output-time monitor for monitoring appropriate and inappropriate time for announcing the caller information in voice form.

25 Claims, 6 Drawing Sheets

TELEPHONE AND CORDLESS TELEPHONE

FIELD OF THE INVENTION

The present invention relates to telephones and cordless telephones to which caller identification service is applicable.

BACKGROUND OF THE INVENTION

Telephones and cordless telephones supporting caller identification service features informing a callee of caller information on a display or through a voice announcement. More specifically, received caller information and caller information registered in a receiving apparatus by the callee are collated. If the received information matches the registered information, the callee is informed that the incoming call is from a registered caller on display or through a voice announcement. For example, a distinctive ring may be used, or a recorded voice message is output to inform the callee that the incoming call is from a specific caller.

In conventional telephones and cordless telephones, caller information announced in voice form is available to the callee only when the caller is registered in the telephone. An unregistered caller cannot thus be announced in voice form. In addition, in the conventional telephones, the incoming call ring may drown out the voice announcement on caller information.

SUMMARY OF THE INVENTION

A telephone and cordless telephone allow caller information to be output in voice form even if a caller is unregistered.

The telephone includes a caller information receiver for receiving an incoming call ring and caller information; a caller information memory for storing the caller information; a voice generator for generating voice data from the caller information; and an audio output unit for outputting the voice data.

The cordless telephone has a base unit and handset. The base unit includes a caller information receiver for receiving an incoming call ring and caller information; a caller information memory for storing the caller information; and a voice generator for generating voice data from the caller information. The handset includes an audio output unit for outputting the voice data and establishes bi-directional wire communications with the base unit.

DETAILED DESCRIPTION OF PREFERRED EMBODIMENT

A telephone in an exemplary embodiment of the present invention generates voice data based on received caller information regardless of whether a caller is registered or not, and announces in voice form the caller information such as a telephone number and name. This telephone analyses how to read out names from non-phonetic letters even when name information is data composed of non-phonetic letters, such as alphabets. The name information data is thus analyzed to enable it to be vocalized, and the caller's name is announced via a speaker in a base unit or handset.

The embodiment of the present invention will be described below with reference to FIGS. 1 to 6. The telephone of the present invention and the base unit of a cordless telephone of the present invention function similarly to each other, and thus the following description on the cordless telephone also applies to the telephone.

Figure 1:
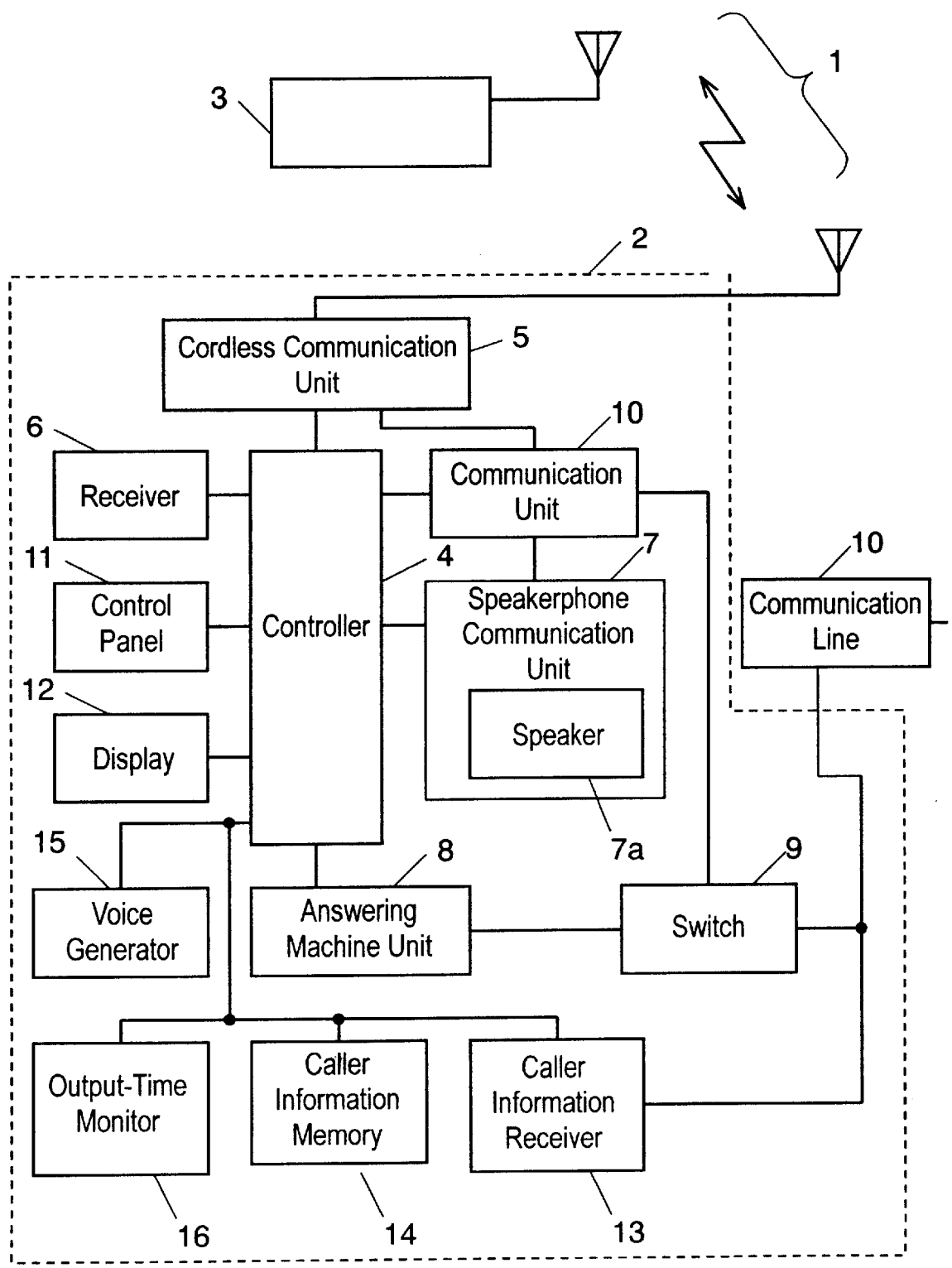
FIG. 1 is a block diagram of a base unit of a cordless telephone in accordance with an exemplary embodiment of the present invention.
Figure 2:
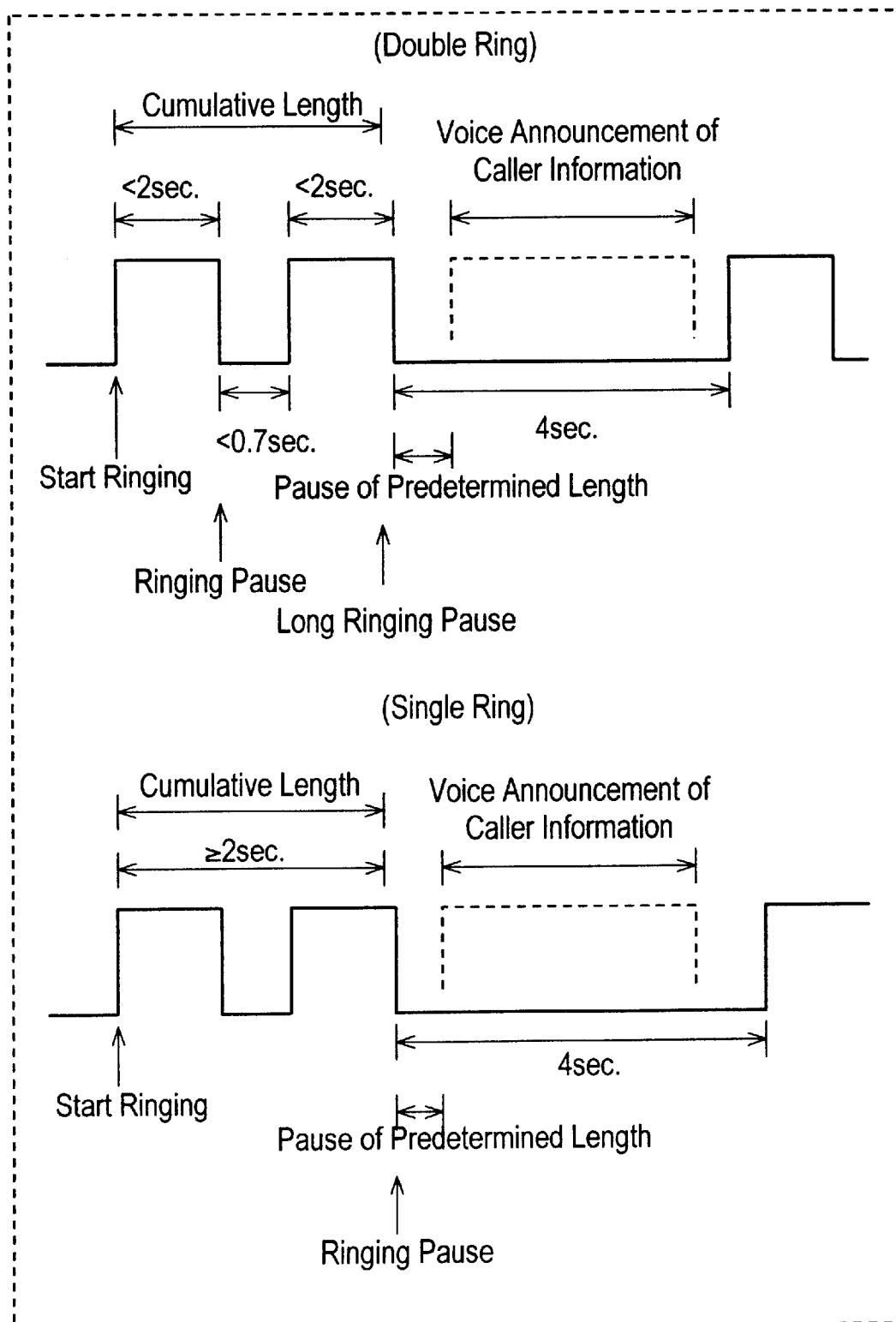
FIG. 2 is a time chart for ringing and voice announcement from a base unit of the cordless telephone in accordance with the embodiment.
Figure 3:
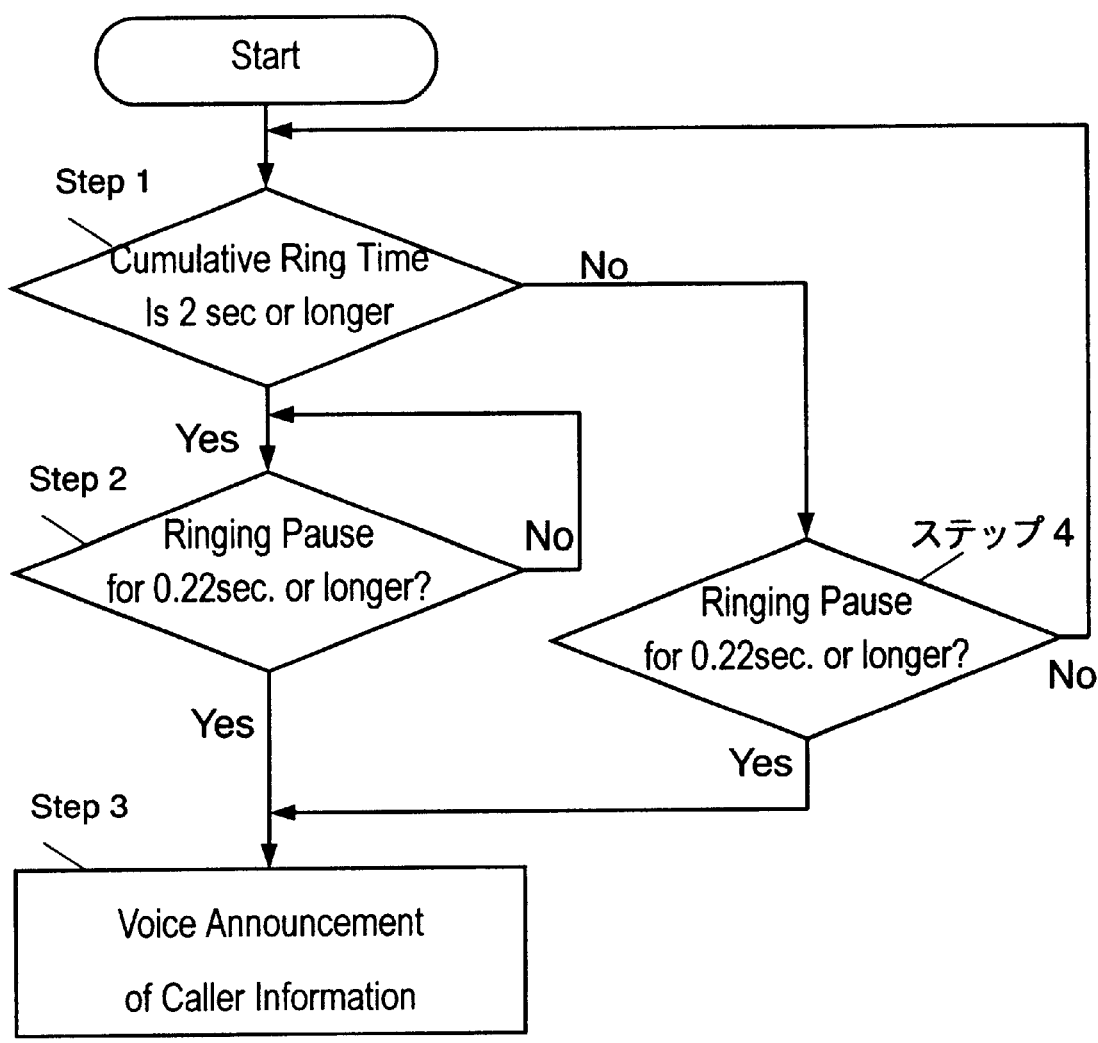
FIG. 3 is a flow chart for voice-announcing caller information from the cordless telephone in accordance with the embodiment.
Figure 4:
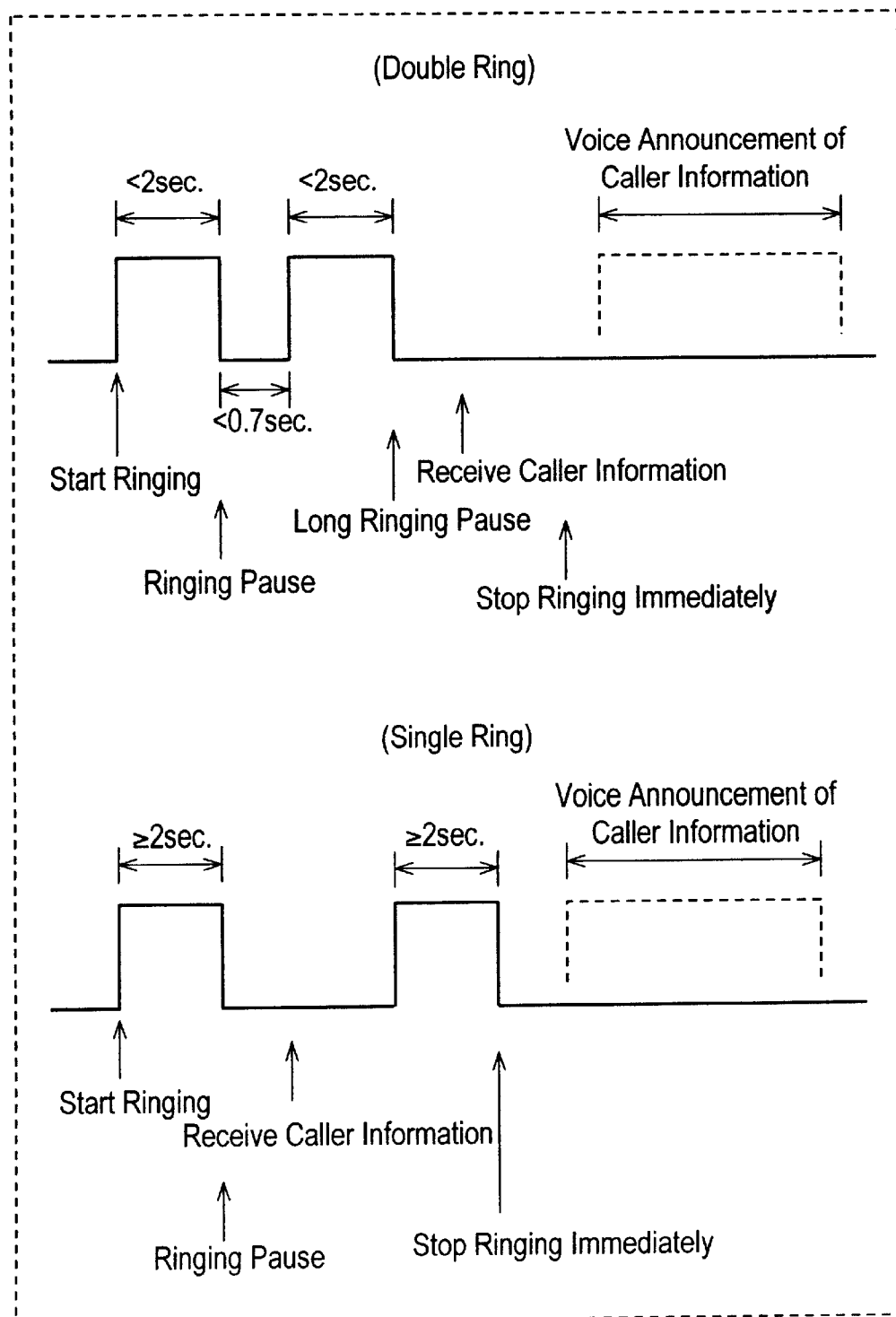
FIG. 4 is a time chart for stopping ringing and making voice announcements from the cordless telephone in accordance with the embodiment.
Figure 5:
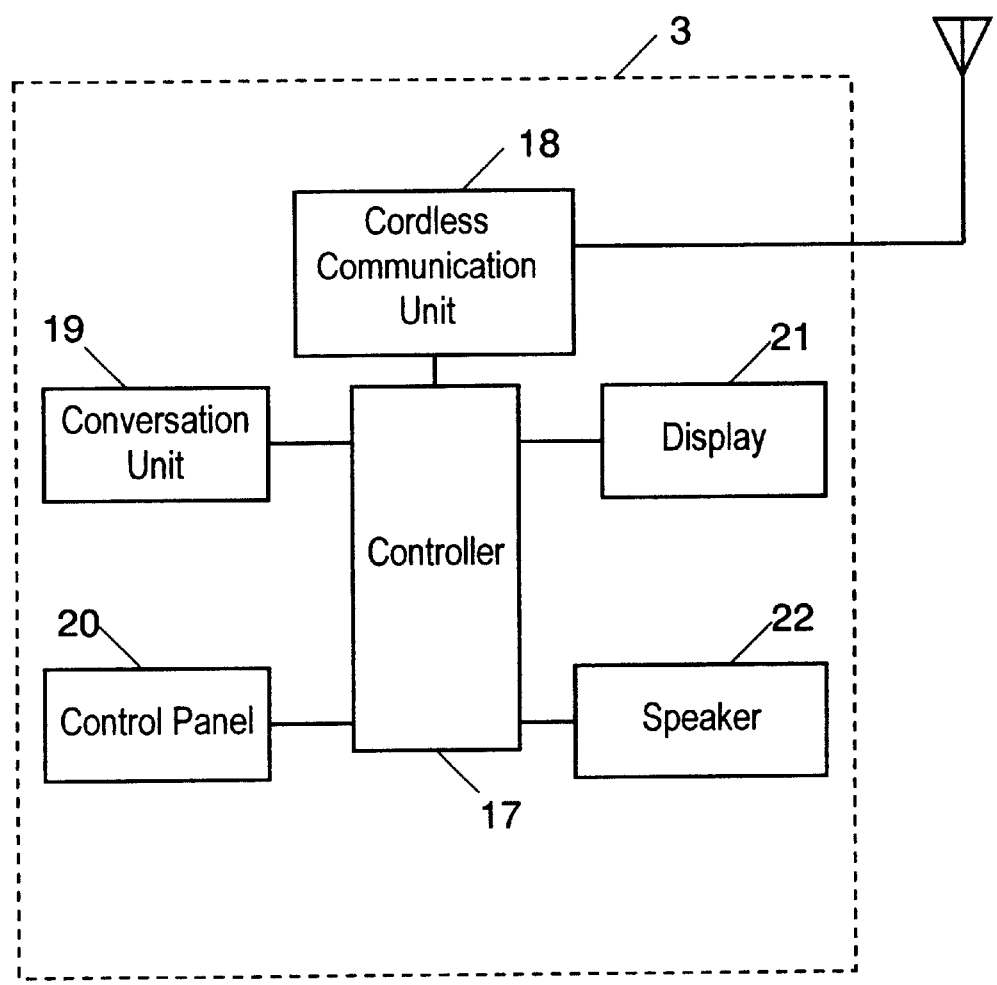
FIG. 5 is a block diagram of a handset of the cordless telephone in accordance with the embodiment.
Figure 6:
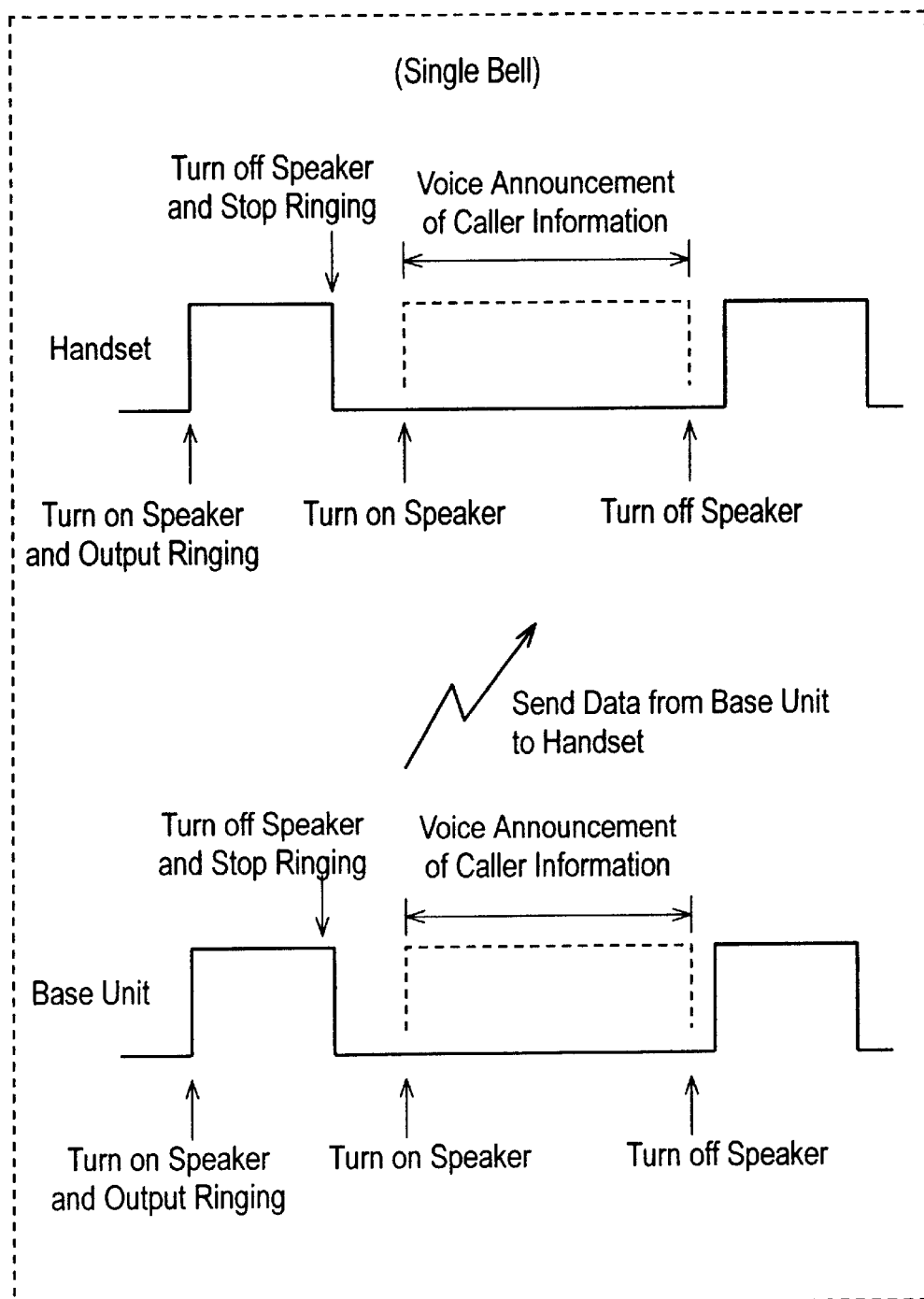
FIG. 6 is a time chart for ringing and making voice announcements from the handset of the cordless telephone in accordance with the embodiment.

FIG. 1 is a block diagram of the base unit of the cordless telephone in the embodiment. FIG. 2 is a time chart for ringing and voice announcements from the base unit. FIG. 3 is a flow chart for voice-announcing caller information from the cordless telephone. FIG. 4 is a time chart for stopping ringing and making voice announcements from the cordless telephone. FIG. 5 is a block diagram of the handset of the cordless telephone. FIG. 6 is a time chart for ringing and making voice announcements from the handset.

In FIG. 1, cordless telephone 1 is configured with base unit 2 connected to a telephone line and at least one handset 3. Base unit 2 and handset 3 use bi-directional wireless communications within a predetermined distance (100 to 150 m at the furthest).

Base unit 2 transmits and receives audio signals to and from the other end of the telephone under the control of controller 4. Base unit 2 also establishes cordless communications with handset 3 in bi-directional through cordless communication unit 5 consisting of a wireless transmitter and wireless receiver. Controller 4 includes a CPU, RAM, and ROM, and controls the entire base unit 2. Handset 6 is wire-connected to base unit 2, and cordless communications with handset 3 (internal calls) and external communications through the telephone line (external calls) can be made by picking up and unhooking handset 6. Base unit 2 is also equipped with speakerphone communication unit 7. Communication without holding the handset is possible by pushing a button for speakerphone communication unit 7 for off hook. In this case, sound is output from speaker 7a in speakerphone communication unit 7. Base unit 2 is also equipped with answering machine 8. When both base unit 2 and handset 3 are kept hooked despite a ring from the line, answering machine 8 is activated to record any incoming messages. In this case, controller 4 changes switch 9 from communication circuit 10 to answering machine 8 if no off-hook operation occurs after a predetermined number of rings (for example, six rings). To place a call, dialing is effected via control panel 11. A dialed telephone number can be confirmed on display 12.

Caller information will be described. Since caller information is originally for display, data is generated in a text format. At present, the contents of caller information in Japan and North America are different. In Japan, the caller information includes only a caller's telephone number, but in North America, the caller information includes both a telephone number and name information. This means that the Japanese caller information lacks the name information included in the North American caller information.

Therefore, further description refers to North American caller information which carries more pieces of information.

When rings comes in from the line, caller information is sent from the caller identification service between the rings. Controller 4 controls the telephone such that caller information receiver 13 receives the caller information and has caller information memory 14 immediately store the caller information. Controller 4 then reads out the caller information stored in caller information memory 14, and sends the original caller information received to display 12, typically a liquid crystal display, and voice generator 15. Contents of the caller information sent to display 12 are displayed in letters, and the contents sent to voice generator 15 is converted into voice data.

Voice generator 15 basically consists of a CPU, RAM, and ROM, and is under the control of controller 4. However, its configuration varies slightly according to the function required. For example, if the Japanese caller information changed from including telephone number information only into including both telephone number information and name information, name information would be received in data on individual phonetic letters, such as katakana. In this case, each letter would be simply converted to voice data to generate a readily comprehensible name. However, in the case of regions using alphabetic scripts for name information, such as in North America, voice announcements would not be understandable simply by vocalizing the sounds of individual letters. As a result, voice generator 15 is required to function for analyzing the pronunciation of a name from its spelling and converting these spellings to comprehensible names. If the functions were required, a CPU with a name pronunciation generating function would need to be installed in voice generator 15. More specifically, a CPU with a ROM storing name patterns is required. In the following description, voice generator 15 has a function for analyzing how to read names, but as described above, this function may not be needed in some areas.

If the name information is included in the caller information received, voice generator 15 analyzes how to pronounce the name as required from the name information, and converts it into voice data. Voice data is sent to speaker 7a to announce the name information in voice form.

If the received name information is alphabetic data "Smith", voice generator 15 analyzes how to read the name, and converts it to voice data to pronounce "Smith" through speaker 7a. In North America, the name information of up to 15 characters is sent as data. This means that long names may be cut off in the middle.

If the received name information is phonetic data "Taro", voice generator 15 converts the data to voice data without modification and announces it through speaker 7a.

If the received caller information includes no name information, the voice generator 15 creates voice data stating that there is no name information available, and this is announced through speaker 7a.

For example, if there is no name information since the caller withholding it, voice generator 15 generates voice data saying "Private caller", which is then announced through speaker 7a.

For example, if there is no name information in the caller information due to out of service area, voice generator 15 generates voice data stating, "Out of area", which is then announced through speaker 7.

For example, if the caller information includes only telephone number but no name information, voice generator 15 generates voice data stating "Number available", which is then announced through speaker 7a.

Voice announcements of the caller information should not be drowned out with ring tone when the information is announced from speaker 7a. Output-time monitor 16 monitors appropriate and inappropriate time for the voice announcements. Output-time monitor 16 thus monitors the cumulative length of the ring or the length of the pause between rings after receiving the ring in order to output the caller information as voice information during an interval between the rings. As shown in FIG. 2, the incoming ring may be a single ring and a double ring. Accordingly, output timing monitor 16 needs to determine the ring pattern of the incoming ring before outputting caller information in voice form. Japan uses a single ring but North America uses both a single ring and a double ring depending on areas. In the case of double ring, the voice announcement of the caller information needs to be made after the second ring for securing sufficient time. In other words, monitor 16 needs to distinguish between the short pause between a pair of rings in the double ring and the long pause after the double ring.

As shown in FIG. 2, in the case of double ring, the individual ring lasts for less than 2 seconds. The interval between the first and second ring is less than 0.7 seconds. Total ring time for the double ring is 2 seconds or longer. This is followed by a 4-second pause before the next pair of rings. In the case of single ring, the ring continues for 2 seconds or longer, followed by a four-second pause before the next single ring.

Accordingly, monitor 16 determines a pause after a single or double ring based on the length of cumulative ring time and the length of the pause between rings, as shown in the flow chart in FIG. 3. Monitor 16 first checks whether the cumulative ring time is 2 seconds or longer (Step 1). If the cumulative time is 2 seconds or longer, monitor 16 determines that a pause is imminent, and checks whether the ring has stopped for 0.22 seconds or longer in order to provide some allowance after the ring has stopped (Step 2). If the ring stops for 0.22 seconds or longer, caller information is output in voice form (Step 3).

In the case of the double ring, monitor 16 needs to determine whether a particular pause is a short pause after the first ring or a long pause after a pair of rings. If the cumulative ring time is less than 2 seconds in Step 1, monitor 16 determines that a double ring pattern is in progress if the second ring starts within 0.7 seconds (Step 4). The monitor then measures the cumulative ring time (Step 1). If the cumulative ring time exceeds 2 seconds during the double ring in Step 1, the pause time after ringing is measured (Step 2).

The operation in Step 4 allows monitor 16 to be applicable to telephone in Japan in which the single ring terminates in 1 second. Monitor 16 determines that the pause after the single or double ring has arrived if the pause lasts more than 0.7 seconds. The caller information is then announced in voice form. Output-time monitor 16 monitors the cumulative time of ring and the time of the pause after the ring to ensure that the caller information is announced in voice form only between the rings.

In FIG. 2, the caller information is announced in voice form during the pause. This voice announcement needs to be completed before the next ring starts regardless of the single or double ring. In some cases, however, the next ring starts before the voice announcement of the caller information is completed. Output-time monitor 16 thus monitors the time from the completion of the last ring, and mutes the incoming ring if the voice announcement of the caller information is still in progress, thereby giving priority to the voice announcement of the caller information.

In order to avoid overlap in time between the voice announce of the caller information from speaker 7a and the ring, the ring is stopped immediately after receiving the caller information, or the ring is executed for a predetermined time after receiving the caller information and then stopped, as shown in FIG. 4.

In the above descriptions, base unit 2 of cordless telephone announces caller information in voice form. Cordless telephone 1 of the present invention also enables handset 3 to voice-announce caller information. How caller information is output in voice form from handset 3 will be described below.

In FIG. 5, handset 3 establishes bi-directional cordless communications with base unit 2 via cordless communication unit 18 controlled by controller 17. Controller 17 includes a CPU, RAM and ROM, and controls overall operations of handset 3. Handset 3 has conversation unit 19 so that conversation over the phone is possible as with handset 6 of base unit 2. Control panel 20 operates mostly in the same manner as control panel 11 of base unit 2. Display 21 is smaller than display 12 of base unit 2 but has sufficient area for displaying required information. Handset 3 also has speaker 22 for outputting incoming rings. Speaker 22 outputs and stops ringing in response to on-off data for turning on and off ringing or on-off data for turning on and off the speaker in accordance with incoming data sent from base unit 2.

Handset 3 can voice-announce the caller information between rings in the same manner as base unit 2. As shown in FIG. 6, base unit 2 outputs the ring from speaker 7a when the ring arrives via a telephone line. Simultaneously, base unit 2 sends speaker-ON data and ringing-ON data to handset 3. Handset 3 outputs the ring from speaker 22 when receiving the data from base unit 2.

When an incoming ring stops entering to base unit 2, base unit 2 stops outputting ringing from speaker 7a. Simultaneously, base unit 2 sends speaker-OFF data and ringing-OFF data to handset 3. When receiving the data from base unit 2, handset 3 stops outputting the ringing from speaker 22.

As described with reference to FIG. 2 and FIG. 3, base unit 2 turns on the speaker in a predetermined time after stopping the ring and makes the announcement of the caller information in voice form from speaker 7a. Simultaneously, base unit 2 sends the speaker-ON data and voice data on caller information generated in voice generator 15 to handset 3. When handset 3 receives data from base unit 2, the speaker is turned on and the caller information is announced in voice form from speaker unit 22.

Base unit 2 then sends the speaker-OFF data to handset 3 as soon as voice announcement of caller information is completed at base unit 2. When handset 3 receives the data from base unit 2, voice announcement of caller information from speaker 22 is stopped.

FIG. 6 shows the case of single ring. The ringing and the voice announcement of the caller information are also controlled similarly to the case of double ring as shown in FIG. 2 and FIG. 3. Similarly to the operation shown in FIG. 4, the telephone may stop the ring immediately or stopped after a predetermined number of rings after receiving the caller information in order to announce the caller information in voice form. Handset 3, when being mounted on base unit 2, does not output the ringing or the voice announcement of the caller information, which are thus output from base unit 2.

In some types of cordless telephone 1, base unit 2 operates merely as a relay station, and handset 3 is equipped with most telephone functions. In this case, base unit 2 may not equipped with speaker 7a if handset 3 is able to voice-announce the name information. If base unit 2 has no speaker 7a, handset 3 rings or voice-announces the caller information even when handset 3 is mounted on base unit 2.

As described above, the telephone of the embodiment enables both the indication of the incoming caller information on a display, and the reading out of the caller's name during the pause between rings through the base unit or handset if the caller information includes the name information. Accordingly, the callee can find out immediately who is calling the callee without looking at the display.

The telephone of the present invention announces caller information in voice form even if the caller is unregistered. In addition, the callee can find out who the caller is without looking at the display.

What is claimed is:

1. A telephone comprising:
   a caller information receiver for receiving an incoming call ring and caller information;
   a caller information memory for storing the received caller information;
   a voice generator for generating voice data from the stored caller information;
   an output-time monitor for monitoring an appropriate time for a voice announcement of the caller information, by determining a ring pattern of an incoming ring and by monitoring a cumulative time length of an incoming ring prior to outputting the generated voice data, and by making a determination according to a length of a pause after the incoming call ring whether or not the pause after the incoming call ring is an interval in a double ring; and
   an audio output unit for outputting the generated voice data based on the determination.

2. The telephone as defined in claim 1, wherein said voice generator sets how to read a name included in name information in the caller information.

3. The telephone as defined in claim 2, wherein said voice generator converts the name into voice data.

4. The telephone as defined in claim 3, wherein, if the name is expressed with a phonetic letter, said voice generator converts the phonetic letter of the name into the voice data.

5. The telephone as defined in claim 1, wherein, if the name information exists in the caller information, said voice generator generates voice data from a name included in the name information.

6. The telephone as defined in claim 1, wherein, if the caller information does not includes name information, said voice generator generates voice data stating that there is no name information available.

7. The telephone as defined in claim 6, wherein, if withholding is set to the caller information, said voice generator generates voice data stating that the caller information is withheld.

8. The telephone as defined in claim 6, wherein, if out of area is set to the caller information, said voice generator generates voice data stating that the caller information is out of area.

9. The telephone as defined in claim 6, wherein, if the caller information includes only telephone number information, said voice generator generates voice data stating that only a telephone number is available.

10. The telephone as defined in claim 1, wherein the output-time monitor for monitoring appropriate and inappropriate time for voice announcement of the caller information, wherein said audio output unit announcing the caller information in voice form when the incoming call ring is not output.

11. The telephone as defined in claim 1, wherein said audio output unit stops outputting the said incoming call ring when the caller information is received, and announces the caller information in voice form.

12. A cordless telephone comprising:
a base unit including:
   a caller information receiver for receiving an incoming call ring and caller information;
   a caller information memory for storing the received caller information;
   a voice generator for generating voice data from the stored caller information; and
   an output-time monitor for monitoring an appropriate time for a voice announcement of the caller information, by determining a ring pattern of an incoming ring and by monitoring a cumulative time length of an incoming ring prior to outputting the generated voice data, and by making a determination according to a pause after the incoming call ring whether or not the pause after the incoming call ring is an interval in a double ring; and
a handset including a first audio output unit for outputting the voice data based on the determination,
wherein said handset establishes bi-directional wireless communications with said base unit.

13. The cordless telephone as defined in claim 12, wherein said voice generator sets how to read out a name included in name information in the caller information.

14. The cordless telephone as defined in claim 13, wherein said voice generator converts the name into voice data.

15. The cordless telephone as defined in claim 14, wherein, if said the name is expressed with a phonetic letter, said voice generator converts the phonetic letter of the name into voice data.

16. The cordless telephone as defined in claim 12, wherein, if the name information exists in the caller information, said voice generator generates voice data of a name included in the name information.

17. The cordless telephone as defined in claim 12, wherein, if the caller information does not includes name information, said voice generator generates voice data stating that there is no name information available.

18. The cordless telephone as defined in claim 17, wherein, if withholding is set to the caller information, said voice generator generates voice data stating that the caller information is withheld.

19. The cordless telephone as defined in claim 17, wherein, if out of area is set to said caller information, said voice generator generates voice data stating that the caller information is out of area.

20. The cordless telephone as defined in claim 17, wherein, if the caller information includes only telephone number information, said voice generator generates voice data stating that only a telephone number is available.

21. The cordless telephone as defined in claim 12,
wherein the output-time monitor for monitoring appropriate and inappropriate time for voice announcement of the caller information, and
wherein said first audio output unit outputs the caller information in voice form when the incoming call ring is not output.

22. The cordless telephone as defined in claim 12, wherein said first audio output unit stops outputting the incoming call ring when the caller information is received, and announces the caller information in voice form.

23. The cordless telephone as defined in claim 12, wherein said base unit further includes a second audio output unit for outputting the voice data.

24. The cordless telephone as defined in claim 23,
wherein said base unit further includes an output-time monitor for monitoring appropriate and inappropriate time for voice announcement of the caller information, and
wherein said second audio output unit outputs the caller information in voice form when the incoming call ring is not output.

25. The cordless telephone as defined in claim 23, wherein said second audio output unit stops outputting the incoming call ring when the caller information is received, and announces the caller information in voice form.

* * * * *